United States Patent [19]

Moles et al.

[11] Patent Number: 4,690,007
[45] Date of Patent: Sep. 1, 1987

[54] GYROSCOPE

[75] Inventors: John A. G. Moles; Colbert M. McMahon, both of Belfast, Northern Ireland

[73] Assignee: Short Brothers PLC, Belfast, Northern Ireland

[21] Appl. No.: 836,533

[22] Filed: Mar. 5, 1986

[30] Foreign Application Priority Data

Mar. 5, 1985 [GB] United Kingdom ................. 8505674

[51] Int. Cl.[4] ....................... G01C 19/12; G01C 19/26
[52] U.S. Cl. .................... 74/5.12; 74/5.6 D; 74/5.7
[58] Field of Search ...................... 74/5.12, 5.1, 5.14, 74/5.7, 5.6 D

[56] References Cited

U.S. PATENT DOCUMENTS

| | | | |
|---|---|---|---|
| 2,720,602 | 10/1955 | Dolude | 74/5.7 X |
| 2,911,832 | 11/1959 | Thierman | 74/5.12 X |
| 3,192,777 | 7/1965 | Zatsky et al. | 74/5.7 X |

FOREIGN PATENT DOCUMENTS

| | | | |
|---|---|---|---|
| 2330998 | 6/1977 | France | 74/5.12 |
| 2365784 | 4/1978 | France | 74/5.12 |
| 764644 | 12/1956 | United Kingdom . | |
| 866400 | 4/1961 | United Kingdom | 74/5.12 |
| 2117114 | 10/1983 | United Kingdom . | |

OTHER PUBLICATIONS

"Development of a Cordite-Driven Gyroscope", Minihan, *Proc. Instn. Mech. Engrs.* 1964-65, vol. 179 Pt. 3E, paper 14, pp. 120-128.

*Primary Examiner*—Rodney H. Bonck
*Attorney, Agent, or Firm*—Cushman, Darby & Cushman

[57] ABSTRACT

A miniature gyroscope having a gas-turbine reaction rotor of dumb-bell form which comprises a pair of masses (62,63) one spaced from the other at opposite ends of a shaft, and an inner gimbal (61) which extends into the space between the two masses and there provides a rotational mounting for the rotor, and means (42) for feeding to the rotor, through the space between the pair of rotor masses, gas to be discharged from the rotor to cause it to spin.

12 Claims, 3 Drawing Figures

GYROSCOPE

BACKGROUND OF THE INVENTION

1. Field of the Invention

This invention relates to a gyroscope and more particularly concerns a gyroscope having a rotor which comprises a pair of masses one spaced from the other at each end of a shaft and an inner gimbal which extends into the space between the two masses and there provides a rotational mounting for the masses.

2. Description of Related Art

A gyroscope of the type described above is disclosed in our earlier British Patent Application No. 2117114. A gyroscope of the earlier application, however, operates on the principle of the impulse turbine and requires provision of a so-called "run-up means" which engages with one end of the shaft of the gyroscope.

SUMMARY OF THE INVENTION

It is one object of the present invention to achieve miniaturisation of a gyroscope comparable with that which can be achieved with the earlier proposal, but at the same time avoiding the additional length in a direction along the rotational axis of the rotor of the gyroscope which is associated with the external run-up means.

According to the present invention there is provided a gyroscope of the type described and characterised in that the rotor is a reaction gas-turbine rotor and in that the gyroscope includes means for feeding to the rotor through the space between the pair of rotor masses gas to be discharged from the rotor to cause it to spin.

DESCRIPTION OF THE PREFERRED EMBODIMENTS

Figure 1:
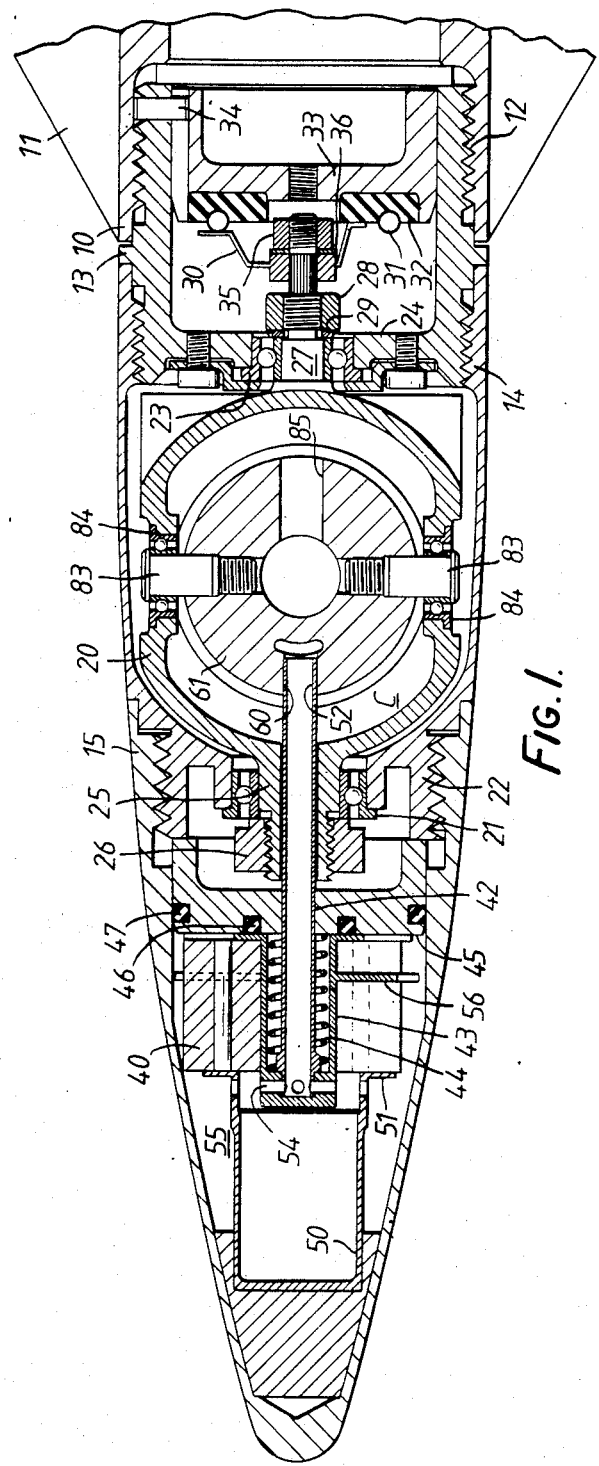
FIG. 1 is a longitudinal diametral section through the nose portion only of an aerial vehicle.

Referring first to FIG. 1, the drawing shows the nose portion, i.e. forward extremity, of a vehicle body 10 with fins 11 and a threaded aperture 12 in which is received a correspondingly threaded gyroscope mounting ring 13 which itself carries, again by threaded engagement, a gyro housing 14. Threadably engaged on the front of the gyro housing 14 is the vehicle nose cone 15 and, as can be seen from FIG. 1, the outer surfaces of the nose cone 15 and gyro housing 14 together define a vehicle nose profile which merges smoothly into the cylindrical shape of the vehicle body 10.

An outer gimbal 20 of a gyroscope fits snugly within a cavity C of the hollow gyro housing 14 and rotates on a forward gimbal bearing 21 carried within a forward bulkhead 22 of the gyro housing 14, and a rear gimbal bearing 23 carried in a forward bulkhead 24 of the ring 13. The forward spigot 25 of the outer gimbal 20 is locked to the inner race of the bearing 21 by a lock nut 26, and the rear gimbal spigot 27 is locked to the inner race of the rear bearing 23 by a lock nut 28 spaced from the race by a washer 29.

Rotation of the rear gimbal spigot 27 relative to the mounting ring 13 is sensed by the movement of a wiping finger 30 on a potentiometer strip 31 housed in an electrically-insulating substrate 32 in a potentiometer base 33 fixed to the ring 13 by a key 34. The finger 30 is fixed against rotation relative to the spigot 27 by its engagement with splines on the spigot, and by a lock nut 35 and washer 36. Signals from the potentiometer are fed to the steering apparatus of the vehicle.

The nose cone 15 houses a plurality of sticks 40 of a propellent material which, when ignited, generates a supply of gas for feeding to the rotor of the gyroscope to cause it to spin. The sticks 40 of propellent are located around the circumference of a gas injector device comprising an injection needle 42 integral with a cup 43 and compression spring 44 which is compressed between the cup 43 and a sealing wall 45, which is fitted with O-rings 46 and 47 to confine gas generated by ignition of the propellent sticks 40 to the space between the hollow nose cone 15 and the injection cup 43.

The sticks 40 are attached to the cup 43 by means of a charge mounting disc 56. The cup 43 is held against the sealing wall 45 by the pressure on the end faces of the sticks 40 of an annular flange 51 at the open end of a cup-shaped can 50 accommodated in the tip of the nose cone 15, which pressure thus holds the spring 44 in a compressed state. The injection needle 42 extends through the sealing wall 45 and coaxially through the forward gimbal spigot 25 until its tip 52 extends into a gas injection bore 60 in the inner gimbal 61 of the gyroscope. The outer gimbal 20 is free to rotate around the injection needle 42 which is fixed against rotation but, because the needle tip 52 and bore 60 are of complementary, non-circular section, cannot rotate while the needle tip 52 is engaged in the bore 60.

In use of the gyroscope, the sticks 40 of propellent are ignited by an ignition capsule accommodated within the can 50, resulting in rapid generation of gas which passes through apertures 54 through the wall of the injection cup 43, so that all of the gas is channelled along the injection needle 42 and into the inner gimbal 61 of the gyroscope. The further flow of gas within the inner gimbal 61 and the rotor of the gyroscope will be described hereinafter with reference to FIG. 2.

During burning of propellant 40, the sticks 40 are consumed. The burning of propellant 40 raises the pressure in the space 55, whereby the cup 43 is forced against the sealing wall 45, hence avoiding leakage even after the sticks 40 no longer transmit the spring pressure to the flange 51. When the pressure drops, the cup 43 and needle 42 assembly is free to move forward into the space vacated by the ignition capsule 50. The cup 43 and needle 42 assembly continue to move forward under the influence of the spring 44 until the charge mounting disc 56 comes to rest against the inside bore of the nose cone 15. The extent of forward movement is sufficient to carry the tip 52 of the injection needle into the bore within the forward gimbal spigot 25, and so uncage the spinning rotor of the gyroscope.

Figure 2:
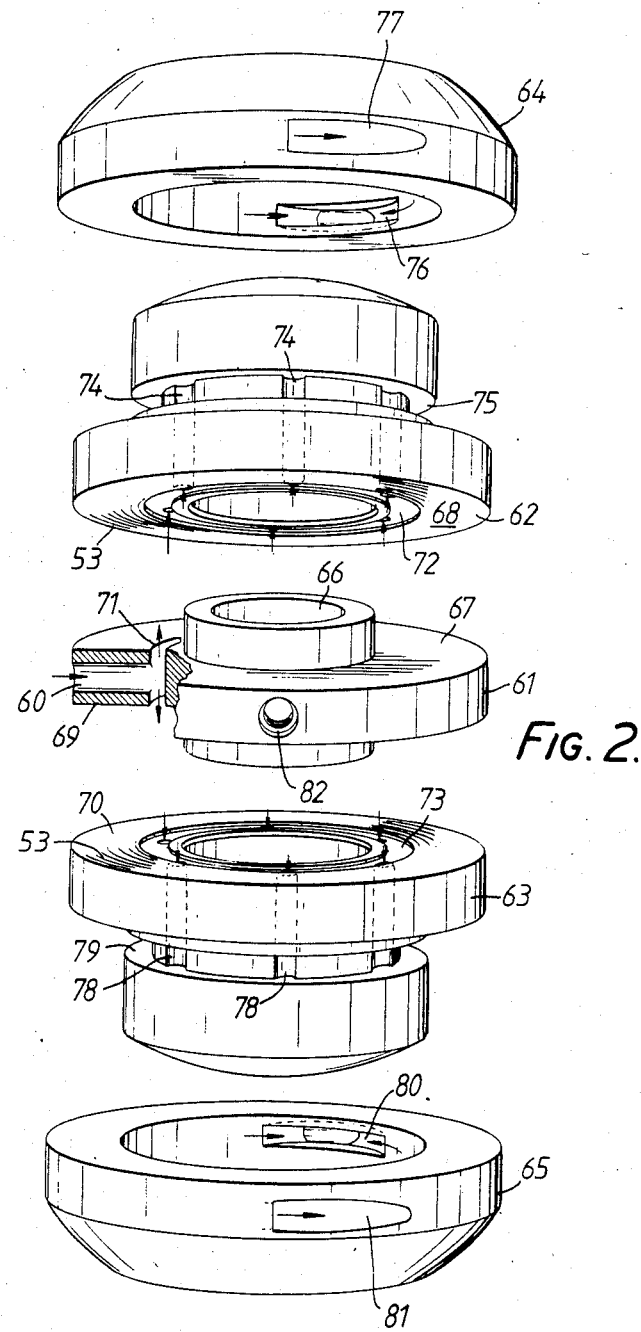
FIG. 2 is an exploded schematic perspective view of the rotor and inner gimbal of a first embodiment of roll position gyroscope according to the invention within the nose portion of the vehicle of FIG. 1.

Referring now to FIG. 2, the inner gimbal 61 is located between a first rotor mass 62 and a second rotor mass 63. The first rotor mass 62 carries by friction pressure engagement a first nozzle ring 64 and the second rotor mass 63 likewise carries a second nozzle ring 65. Not shown in FIG. 2 is the shaft of the gyroscope rotor which extends between the first and second rotor masses through a shaft aperture 66 on the axis of the inner gimbal 61. The shaft is mounted by ball bearings for rotation within the shaft aperture 66, and against rotation to each of the rotor masses 62 and 63. Thus, the first and second rotor masses 62 and 63, and the shaft connecting them, constitute a dumb-bell-form rotor assembly.

The facing surfaces 67 and 68 of the inner gimbal and first rotor mass, and 69 and 70 between the inner gimbal and second rotor mass do not touch and so do not prevent the free rotation of the rotor on the gimbal 61, but nevertheless they are sufficiently close as to inhibit any substantial transverse flow of gas between them and parallel to the faces. Incorporated in the faces 68 and 70 are labyrinth seals which consist of concentric machined rings 53 of a form adapted to restrict the transverse flow of gas between the mating faces 67 and 68, and 69 and 70. Gas injected into the inner gimbal 61 along the injection bore 60 is delivered by a kidney-shaped aperture 71 to a gallery 72 in the first rotor mass 62 and a like gallery 73 in the second rotor mass 63. From the gallery 72 the gas passes along six axial bores 74 equally spaced around the circumference of the first rotor mass 62 to an annular passage 75 from which the gas flows to a pair of funnels 76 in the nozzle ring 64, each serving a particular one of two nozzles 77 on the external face of the nozzle ring 64. Likewise, in the second rotor mass 63, gas flows along six axial bores 78 to an annular passage 79 and a pair of funnels 80 serving nozzles 81 in the second nozzle ring 65.

All four nozzles 77 and 81 are so shaped as to generate an exit flow of gas along a tangent to the circumference of the respective nozzle rings 64 and 65, and such that the reaction forces consequent upon this gas ejection are additive to spin the rotor.

FIG. 2 shows one of the pair of threaded bores 82 by which the inner gimbal 61 is rotatably mounted to the outer gimbal 20 (FIG. 1). The mounting is seen more clearly in FIG. 1, in which a pair of inter-gimbal mounting stub shafts 83 engage threadably with the apertures 82 (FIG. 2) in the inner gimbal and themselves carry the inner races of inter-gimbal ball bearings 84. FIG. 1 also shows that the inner gimbal 61 includes an additional bore 85 the purpose of which is to provide an inertial balance to the gas injection aperture 60, so that there is no resultant sideways force on the gyroscope shaft when the rotor is spinning.

In a first variation, the outer gimbal 20 can be cantilevered from a position to the rear of the gyroscope rotor, in which case it is convenient to provide two spaced ball bearings along an elongated rear gimbal spigot.

In a second variation, the injection needle 42 has a tip 52 in the form of a fork which engages a pin across the diameter of the bore 60 in the inner gimbal 61 so that the gimbal cannot rotate relative to the needle.

In a third variation, the potentiometer base 33 is mounted on the rear face of the forward bulkhead 24, forward of the wiping finger 30.

Figure 3:
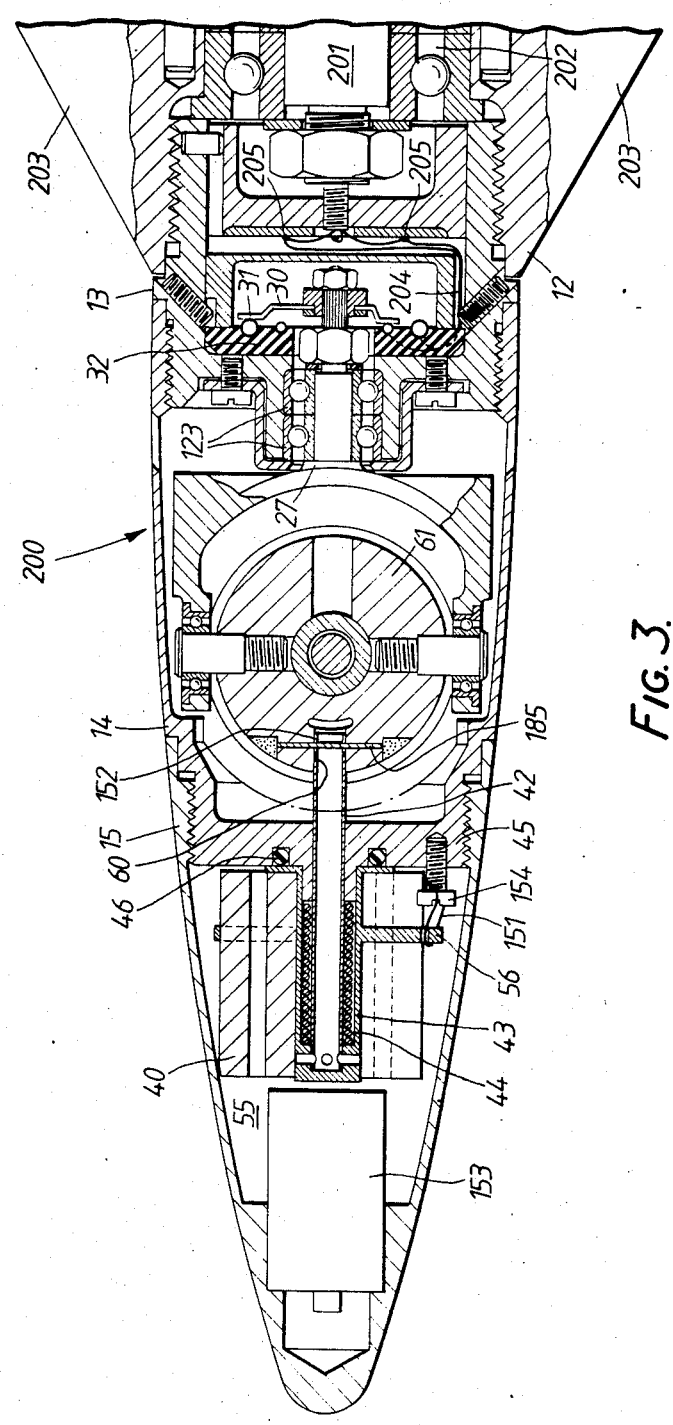
FIG. 3 is a section corresponding to FIG. 1, of a second embodiment.

These three variations are shown in FIG. 3, in which those parts which correspond to parts of the FIGS. 1 and 2 embodiment are identified by the same reference numerals.

In FIG. 3, the rear gimbal spigot 27 rotates on a duplex pair of gimbal bearings 123, and there is no forward spigot 25 or bearing 21. The potentiometer strip 31 and substrate 32 are mounted on a rearward, not forward, facing surface of the ring 13. Forward of the inner gimbal 61, the wall 45 is part of the gyro housing 14 so the O-ring is unnecessary.

The injection needle 42 extends through the wall 45 until its tip 52 extends, as in FIG. 1, into a gas injection bore 60 within the inner gimbal 61. It has a slot 152 in its tip, which engages with a caging pin 185 mounted in the gimbal 61. This engagement prevents rotation of the gimbal 61 relative to the needle 42.

The force of the spring 44 is resisted by a NYLON thread 151 which holds the charge mounting disc 56 to a screw 154 in the wall 45. The thread 151 is consumed during the burning of the propellant sticks 40. The sticks 40 are ignited by an ignition capsule 153 which is itself consumed during ignition of the propellant sticks 40.

In use, the drop in pressure in the space 55 when the sticks 40 are burnt again allows the assembly of cup 43 and needle 42 to move forwardly under the influence of the spring 44. The extent of such forward movement is enough to carry the tip 52 of the needle into the wall 45. With this movement, the gyro rotor becomes uncaged and free to rotate in all planes.

FIG. 3 shows how the gyroscope may be housed in a nose assembly 200 of an aerial guided missile, the nose 200 rotating relative to a body portion 201 on a bearing 202 (only part shown). Such rotation is induced by a pair of control surfaces 203. Signals from the potentiometer strip 31 are fed by leads 204 to wiper rings 205, where they can be collected and delivered to guidance circuitry (not shown) in the body portion. This circuitry may use signals from a second potentiometer strip device mounted between the nose and the body.

We claim:

1. A gyroscope having a gas-turbine reaction rotor which comprises a pair of masses, one spaced from the other at each end of a shaft, and an inner gimbal which extends into the space between the two masses and there provides a rotational mounting for the masses, and means for feeding to the rotor, through the space between the pair of rotor masses, gas to be discharged from the rotor to cause it to spin.

2. A gyroscope as claimed in claim 1 including an outer gimbal provided with first and second co-axial spigots, one on each side of the rotor and mounted in bearings for rotation of the outer gimbal with movement of the rotor.

3. A gyroscope as claimed in claim 2 including means for sensing relative rotation between one of the first and second spigots and a structure in which the spigot is mounted.

4. A gyroscope as claimed in claim 1 including an outer gimbal provided with a single spigot mounted in a bearing arrangement so that the rotor and its gimbals are mounted on the bearing arrangement in cantilever fashion.

5. A gyroscope as claimed in claim 4 including means for sensing relative rotation between the single spigot and a structure in which the spigot is mounted.

6. A gyroscope as claimed in claim 1 additionally comprising solid propellant material and an ignition capsule to ignite the material to provide by combustion of the propellant material the propellant gas when required.

7. A gyroscope as claimed in claim 6 wherein the means for feeding gas to the rotor comprises a gas injection needle mounted in the structure which houses the gyroscope and being movable relative to the rotor between an engaged disposition, in which the tip of the needle is engaged with the inner gimbal for delivery of the gas to the inner gimbal, and serving also to cage the gyroscope until the rotor is spinning, and a disengaged disposition, in which the tip of the needle is disengaged from the inner gimbal so that the gyroscope is not caged by the engagement of the needle with the inner gimbal.

8. A gyroscope as claimed in claim 7 wherein the needle is straight and moves by translation between its engaged and disengaged dispositions, in a direction along its length, the needle lying on the axis of rotation of the outer gimbal and being fixed against rotation in the structure housing the gyroscope, the engagement of the needle and the inner gimbal being such as to prevent rotation of the inner gimbal relative to the needle.

9. A gyroscope as claimed in claim 8 wherein the said engagement of needle and inner gimbal is between a pin in the gimbal transverse to the length of the needle and a slot in a forked tip of the needle.

10. A gyroscope as claimed in claim 7 wherein the gas injection needle is spring-biased out of engagement with the inner gimbal, but is held in engagement during delivery of the propellant gas by the pressure of said gas.

11. A gyroscope as claimed in claim 10, wherein the needle is held in engagement with the inner gimbal, until ignition of the propellant material, by a mechanical link between the needle and structure housing the rotor, which link is destroyed by the combustion of the propellant material.

12. A gyroscope as claimed in claim 10 wherein the needle is held in engagement with the inner gimbal, until ignition of the propellant material by use of the propellant material, itself to transmit from the structure which houses the rotor a force of reaction to the force of the spring-bias of the needle.

* * * * *